US012056961B2

(12) United States Patent
Higashide et al.

(10) Patent No.: US 12,056,961 B2
(45) Date of Patent: Aug. 6, 2024

(54) OPERATION MANAGEMENT METHOD, SERVER, AND SYSTEM

(71) Applicant: TOYOTA JIDOSHA KABUSHIKI KAISHA, Toyota (JP)

(72) Inventors: Hiroshi Higashide, Nagoya (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/237,479

(22) Filed: Aug. 24, 2023

(65) Prior Publication Data

US 2023/0394891 A1 Dec. 7, 2023

Related U.S. Application Data

(63) Continuation of application No. 17/512,214, filed on Oct. 27, 2021, now Pat. No. 11,776,324.

(30) Foreign Application Priority Data

Oct. 27, 2020 (JP) ................................ 2020-180005

(51) Int. Cl.
*G07C 5/00* (2006.01)
*G08G 1/00* (2006.01)

(52) U.S. Cl.
CPC ............. *G07C 5/006* (2013.01); *G07C 5/008* (2013.01); *G08G 1/205* (2013.01); *G08G 1/207* (2013.01)

(58) Field of Classification Search
CPC ........ G07C 5/006; G07C 5/008; G08G 1/205; G08G 1/207
See application file for complete search history.

(56) References Cited

U.S. PATENT DOCUMENTS

| | | | |
|---|---|---|---|
| 6,728,630 | B1 | 4/2004 | Burt et al. |
| 2020/0312149 | A1 | 10/2020 | Umeda |
| 2022/0187081 | A1 | 6/2022 | Fujita et al. |

FOREIGN PATENT DOCUMENTS

| | | | |
|---|---|---|---|
| JP | 2003-168193 | A | 6/2003 |
| JP | 2006-163738 | A | 6/2006 |
| JP | 2020-013379 | A | 1/2020 |
| JP | 2020-160836 | A | 10/2020 |

OTHER PUBLICATIONS

Oct. 11, 2023 Office Action issued in U.S. Appl. No. 17/498,914.

*Primary Examiner* — Mathew Franklin Gordon
(74) *Attorney, Agent, or Firm* — Oliff PLC

(57) ABSTRACT

An operation management method for managing a plurality of circulating buses, each circulating bus being introduced into a circulation route from a base and returning to the base to be switched with another circulating bus after traveling a specified number of laps, includes storing, by a server, an operation schedule of the plurality of circulating buses, judging, by the server, whether a predetermined condition is satisfied when a predetermined event not planned in the operation schedule occurs, and revising, by the server, the operation schedule to introduce an additional circulating bus into the circulation route from the base when it is judged that the predetermined condition is satisfied.

20 Claims, 5 Drawing Sheets

OPERATION MANAGEMENT METHOD, SERVER, AND SYSTEM

CROSS-REFERENCE TO RELATED APPLICATION

This application is a continuation of application Ser. No. 17/512,214, filed Oct. 27, 2021, which claims priority to Japanese Patent Application No. 2020-180005, filed on Oct. 27, 2020, the entire contents of each of which are incorporated herein by reference.

TECHNICAL FIELD

The present disclosure relates to an operation management method, a server, and a system.

BACKGROUND

Technology for managing the operation of a plurality of vehicles is known. For example, patent literature (PTL) 1 discloses an autonomous vehicle that circulates along a travel route provided by a management center.

CITATION LIST

Patent Literature

PTL 1: JP 2020-013379 A

SUMMARY

There is room for improvement in technology for managing the operation of a plurality of vehicles.

It would be helpful to improve technology for managing operation of a plurality of vehicles.

An operation management method according to an embodiment of the present disclosure is an operation management method for managing a plurality of circulating buses, each circulating bus being introduced into a circulation route from a base and returning to the base to be switched with another circulating bus after traveling a specified number of laps, the operation management method including:

- storing, by a server, an operation schedule of the plurality of circulating buses;
- judging, by the server, whether a predetermined condition is satisfied when a predetermined event not planned in the operation schedule occurs; and
- revising, by the server, the operation schedule to introduce an additional circulating bus into the circulation route from the base when it is judged that the predetermined condition is satisfied.

A server according to an embodiment of the present disclosure includes a communication interface configured to communicate with a plurality of circulating buses, each circulating bus being introduced into a circulation route from a base and returning to the base to be switched with another circulating bus after traveling a specified number of laps, and a controller configured to:

- store an operation schedule of the plurality of circulating buses;
- judge whether a predetermined condition is satisfied when a predetermined event not planned in the operation schedule occurs; and
- revise the operation schedule to introduce an additional circulating bus into the circulation route from the base when it is judged that the predetermined condition is satisfied.

A system according to an embodiment of the present disclosure is a system including a plurality of circulating buses, each circulating bus being introduced into a circulation route from a base and returning to the base to be switched with another circulating bus after traveling a specified number of laps, and a server configured to communicate with the plurality of circulating buses, wherein

- the server is configured to store an operation schedule of the plurality of circulating buses;
- the plurality of circulating buses operates in accordance with the operation schedule;
- the server is configured to
  - judge whether a predetermined condition is satisfied when a predetermined event not planned in the operation schedule occurs, and
  - revise the operation schedule to introduce an additional circulating bus into the circulation route from the base when it is judged that the predetermined condition is satisfied; and
- the plurality of circulating buses operates in accordance with the revised operation schedule.

According to an embodiment of the present disclosure, technology for managing the operation of a plurality of vehicles is improved.

DETAILED DESCRIPTION

Hereinafter, an embodiment of the present disclosure will be described.

Summary of Embodiment

Figure 1:
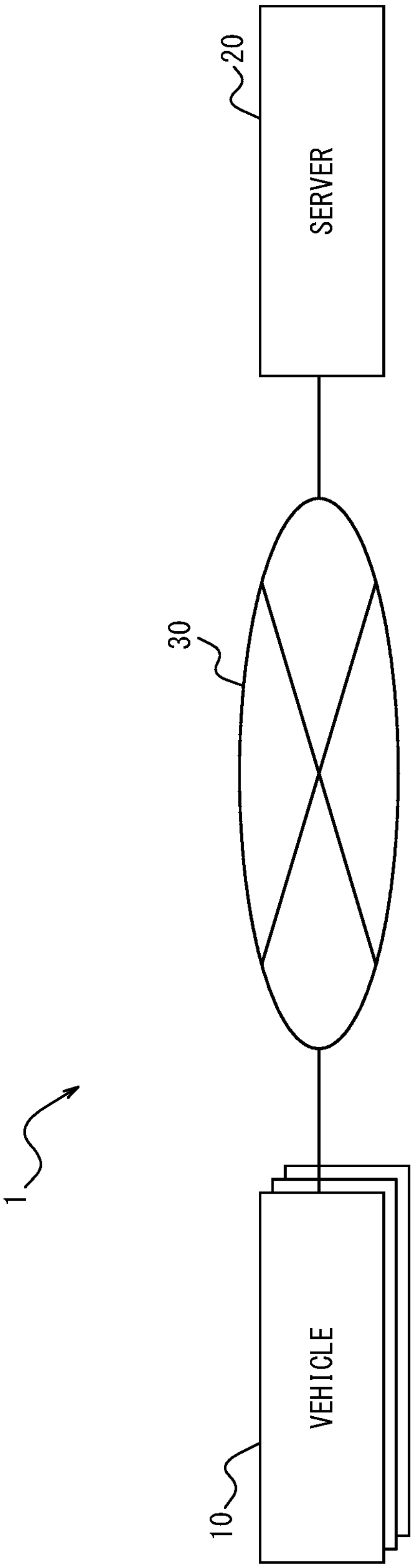
FIG. 1 is a block diagram illustrating a schematic configuration of a system according to an embodiment of the present disclosure.

An outline of a system 1 according to an embodiment of the present disclosure will be described with reference to FIG. 1. The system 1 includes a plurality of vehicles 10 and a server 20. The plurality of vehicles 10 and the server 20 can communicate with each other via a network 30 including, for example, the Internet and a mobile communication network. The vehicle 10 is, for example, a passenger automobile such as a bus, but the vehicle 10 is not limited to this and may be any vehicle that a person can board. The vehicle 10 may be capable of automated driving such as any one of Level 1 to Level 5 as defined by the Society of Automotive Engineers (SAE), for example. The server 20 is, for example, an information processing apparatus such as a computer.

In the present embodiment, the plurality of vehicles 10 are used as circulating buses that travel over a circulation route. The server 20 manages the operation of the plurality of vehicles 10 by notifying the plurality of vehicles 10 of an operation schedule. The plurality of vehicles 10 operate in accordance with the operation schedule notified by the server 20.

Figure 2:
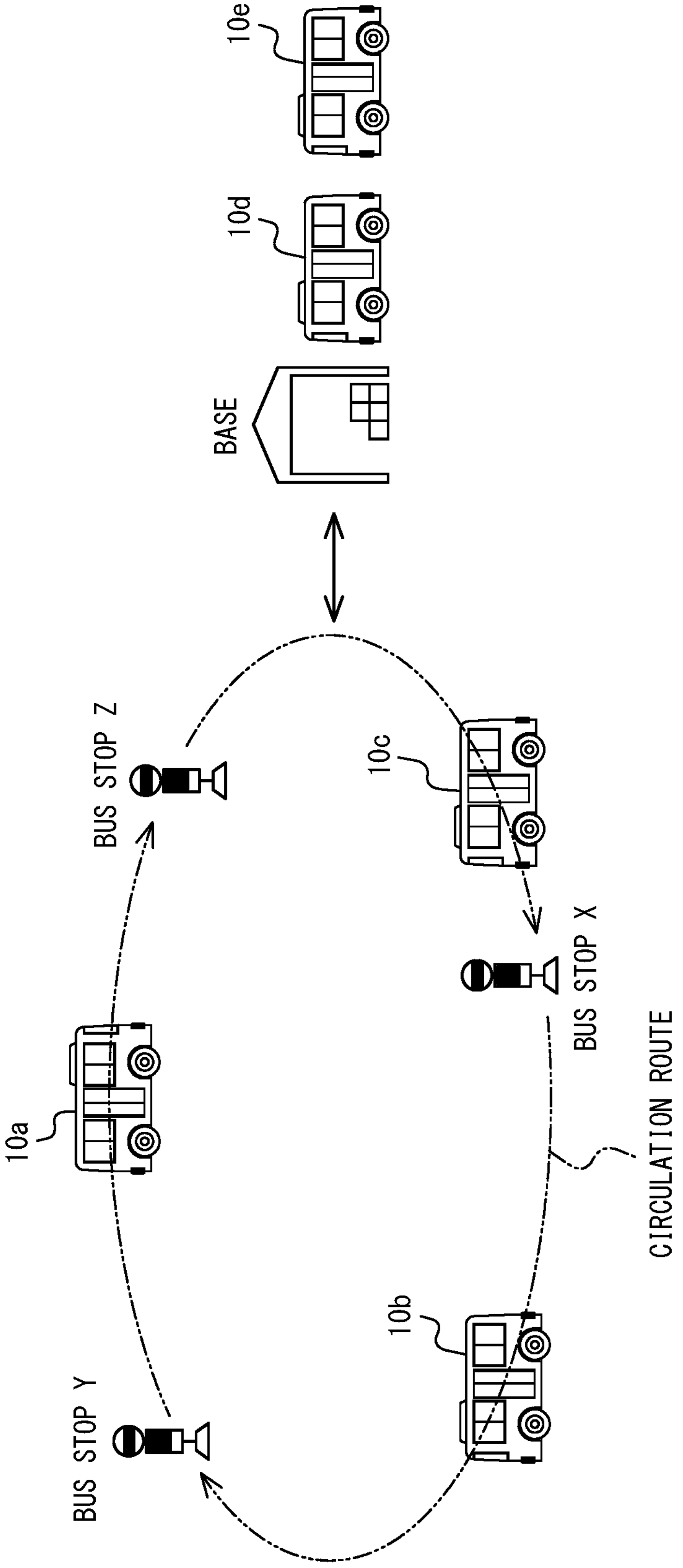
FIG. 2 is a diagram illustrating an overview of a transportation service according to an embodiment of the present disclosure.

With reference to FIG. 2, an overview of operations of each vehicle 10 that operates in accordance with the operation schedule will be described. When introduced into the circulation route from a base, each vehicle 10 can travel clockwise along the circulation route while allowing passengers to get on and off at each bus stop among bus stops X to Z on the circulation route. In FIG. 2, three vehicles 10*a* to 10*c* are traveling on the circulation route. When each vehicle 10 has traveled a specified number of laps n (n is a natural number equal to or greater than 2, and n=4 laps in the present embodiment) after being introduced into the circulation route, the vehicle 10 returns to the base and switches with another vehicle 10 on standby. Here, "switches" indicates that the vehicle 10 returns to the base from the circulation route and that the other vehicle 10 on standby is introduced into the circulation route from the base. The switching of a vehicle 10 with another vehicle 10 on standby is also referred to below as "normal switching". In FIG. 2, two vehicles 10*d*, 10*e* are on standby at the base. While on standby after returning to the base from the circulation route, each vehicle 10 can undergo operations such as refueling and maintenance, for example. "Refueling" includes, but is not limited to, refueling with gasoline, and may also include recharging when the vehicle 10 is an electric automobile, for example.

Figure 3:
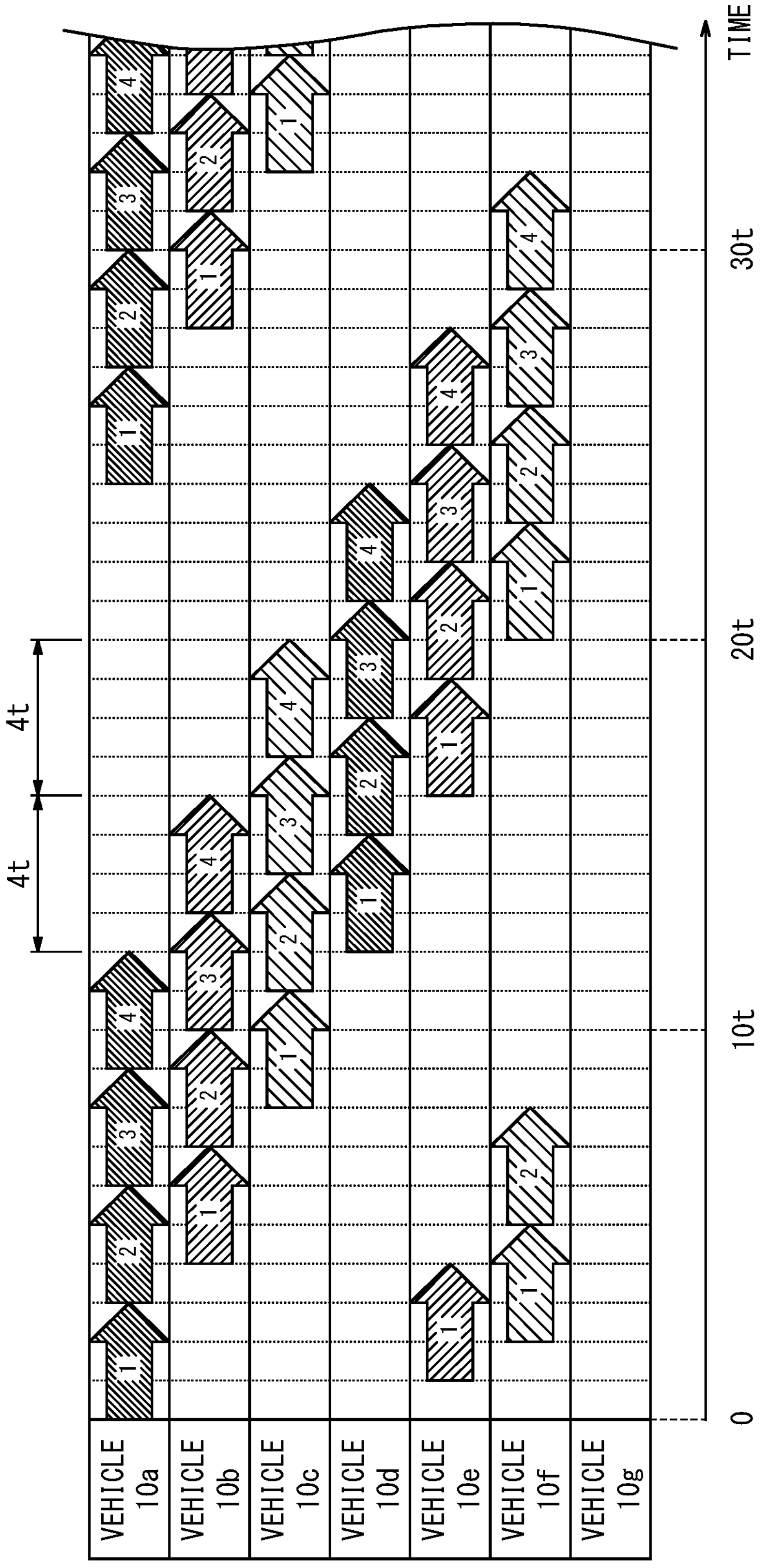
FIG. 3 is a diagram illustrating an example of an operation schedule.

With reference to FIG. 3, the operation schedule will be explained in detail. FIG. 3 illustrates the operation schedule assigned to each of seven vehicles 10*a* to 10*g*. The horizontal axis in FIG. 3 indicates the time. Time=0 is an operation start time of the transportation service using the plurality of vehicles 10. The time periods depicted with a rightward arrow indicate that the vehicle 10 is traveling on the circulation route. The length of the arrow indicates the time (3t in the present embodiment) required for the vehicle 10 to travel one lap on the circulation route. The numerical value inside the arrow indicates the number of the lap that the vehicle 10 is on after introduction into the circulation route. The time corresponding to the left end of the arrow with the number "1" inside indicates the time when the vehicle 10 is introduced into the circulation route from the base. The time corresponding to the right end of an arrow indicates the time at which the vehicle 10 returns to the base from the circulation route if there is no continuous next arrow to the right of the arrow.

When the operation schedule illustrated in FIG. 3 is applied, the vehicle 10*a* is introduced into the circulation route from the base at time=0, and when the vehicle 10*a* completes the specified number of laps n (here, n=4 laps) at time=12t, the vehicle 10*a* returns to the base and is switched with the vehicle 10*d* on standby, for example. The vehicle 10*d* is introduced into the circulation route from the base at time=12t, returns to the base at time=24t after completing the specified number of laps n (here, n=4 laps), and is switched with the vehicle 10*a* on standby. In this way, the vehicles 10*a* and 10*g* operate while switching with each other. Similarly, the vehicles 10*b* and 10*e* operate while switching with each other, and the vehicles 10*c* and 10*f* operate while switching with each other. Here, the vehicle 10*b* is introduced into the circulation route at time=4t, and the vehicle 10*c* is introduced into the circulation route at time=8t.

Consequently, according to the operation schedule, the number of vehicles 10 traveling on the circulation route is maintained at the specified number (in this case, a=3) from time=8t onwards. From time=8t onwards, "a" vehicles 10 traveling on the circulation route are arranged at substantially equal intervals on the circulation route. The above-described normal switching also occurs once in a specified period P (here, P=4t) from time=12t onwards. Also, from time=8t onwards, a plurality of vehicles 10 are not on the same lap simultaneously among the "a" vehicles 10 traveling on the circulation route (i.e., the number of the lap being traveled differs for each of the "a" vehicles 10 traveling on the circulation route). For example, vehicles 10*a*, 10*b*, and 10*c*, which are traveling on the circulation route at time=8t, are traveling on their third, second, and first laps, respectively. Since a plurality of vehicles 10 are not on the same lap simultaneously, the specified period P can be longer than the time required for the vehicle 10 to make one lap of the circulation route (in this case, 3t). By lengthening the specified period P in which the normal switching occurs, the frequency with which the vehicles 10 return to the base from the circulation route (for example, the frequency with which regular switching occurs) is reduced, thereby increasing the time available for operations such as refueling and maintenance to be performed on the vehicles 10 that return to the base.

As an exception, the vehicle 10*e* is introduced into the circulation route at time=t and is switched with the vehicle 10*b* at time=4t. As an exception, the vehicle 10*f* is introduced into the circulation route at time=2t and is switched with the vehicle 10*c* at time=8t.

Consequently, according to the operation schedule, the number of vehicles 10 traveling on the circulation route is maintained at the specified number (in this case, a=3) from time=2t onwards. From time=2t onwards, "a" vehicles 10 traveling on the circulation route are arranged at substantially equal intervals on the circulation route. The above-described normal switching occurs once in each specified period P (here, P=4t) from time=4t onwards. Note that during a certain time period (here, the period from time=0 to time=8t) from the operation start time of the transportation service, a plurality of vehicles 10 are on the same lap simultaneously on an exceptional basis. For example, the vehicles 10*a* and 10*f*, which are on the circulation route at time=5t, are both on their second lap. However, in order for the cycle in which the normal switching occurs to be maintained as the specified period P (here, P=4t), the vehicles 10*e* and 10*f* that are exceptionally introduced during the certain time period are switched with the vehicles 10*b* and 10*c*, respectively, before completing the specified number of laps n (here, n=4 laps).

In addition, each vehicle 10 travels automatically so as to follow the operation schedule. Specifically, each vehicle 10 has an upper speed limit allowed in advance. When a vehicle 10 traveling on the circulation route is delayed relative to its operation schedule, for example, the vehicle 10 can accelerate, to an extent such that the vehicle speed does not exceed the upper speed limit, in order to reduce or eliminate the delay.

When a predetermined event that is not planned in the operation schedule occurs, the introduction of an additional vehicle 10 into the circulation route from the base is considered. The event is any event such that the supply (for example, the number of vehicles 10 traveling on the circulation route) becomes relatively low compared to the demand (for example, the number of passengers) for the transportation service that uses the plurality of vehicles 10. Specifically, examples of events that result in a reduction in the supply of the transportation service include an event in which a vehicle 10 traveling on the circulation route experiences failure, and an event in which the delay time relative to the operation schedule of a vehicle traveling on the circulation route becomes equal to or greater than a threshold. On the other hand, examples of events that increase the demand for the transportation service include an event in which the number of passengers using the transportation service (for example, the total of the number of passengers waiting for the arrival of a vehicle 10 at a bus stop and the number of passengers on board the vehicles 10 traveling on the circulation route) becomes equal to or greater than a threshold. The introduction of an additional vehicle 10 into the circulation route from the base is also referred to below as "additional introduction".

However, if additional introduction is performed every time the above-described event occurs, then even the vehicles 10 awaiting normal switching at the base end up being used for the additional introduction, for example, which may have an adverse effect on the operation schedule, such as preventing the performance of normal switching.

In contrast, the server 20 of the present embodiment stores the operation schedule of a plurality of vehicles 10. When a predetermined event that is not planned in the operation schedule occurs, the server 20 judges whether a predetermined condition is satisfied. When the server 20 judges that the predetermined condition is satisfied, the server 20 revises the operation schedule to introduce an additional vehicle 10 into the circulation route from the base.

According to this configuration, when a predetermined event that is not planned in the operation schedule occurs, it is judged whether the additional introduction should be performed. Accordingly, the technology for managing the operation of the plurality of vehicles 10 is improved by a reduction in the possibility of an adverse effect on the operation schedule as compared to a configuration in which the additional introduction is performed each time a predetermined event occurs, for example.

Next, configurations of the system 1 will be described in detail.

(Configuration of Vehicle)

Figure 4:
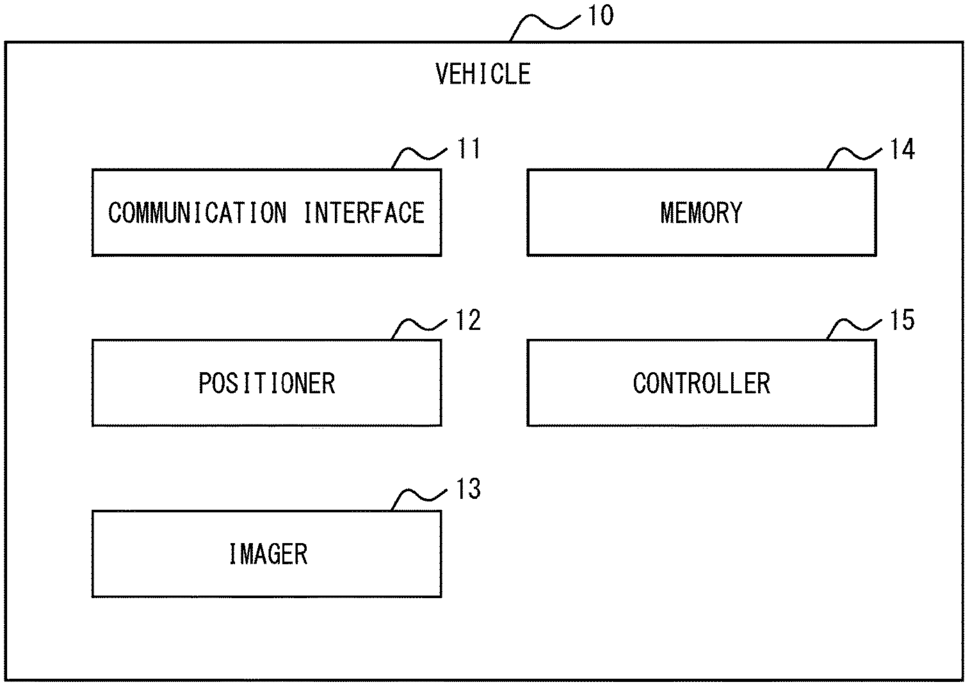
FIG. 4 is a block diagram illustrating a schematic configuration of a vehicle.

As illustrated in FIG. 4, the vehicle 10 includes a communication interface 11, a positioner 12, an imager 13, a memory 14, and a controller 15.

The communication interface 11 includes at least one communication interface for connecting to the network 30. The communication interface is compliant with mobile communication standards such as the 4th generation (4G) standard or the 5th generation (5G) standard, for example, but these examples are not limiting. In the present embodiment, the vehicle 10 communicates with the server 20 via the communication interface 11 and the network 30.

The positioner 12 includes one or more apparatuses configured to acquire positional information for the vehicle 10. Specifically, the positioner 12 includes, for example, a receiver compliant with GPS, but is not limited to this example and may include a receiver compliant with any appropriate satellite positioning system.

The imager 13 includes one or more cameras. Each camera included in the imager 13 may be installed in the vehicle 10 so as to be able to capture a subject outside or inside the vehicle, for example. The images generated by the imager 13 can, for example, be used for autonomous driving control of the vehicle 10.

The memory 14 includes one or more memories. The memories are semiconductor memories, magnetic memories, optical memories, or the like, for example, but are not limited to these. The memories included in the memory 14 may each function as, for example, a main memory, an auxiliary memory, or a cache memory. The memory 14 stores any information used for operations of the vehicle 10. For example, the memory 14 may store a system program, an application program, embedded software, and the like. The information stored in the memory 14 may be updated with, for example, information acquired from the network 30 via the communication interface 11.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire vehicle 10. For example, the controller 15 controls the operations of the vehicle 10 according to the operation schedule notified by the server 20.

(Configuration of Server)

Figure 5:
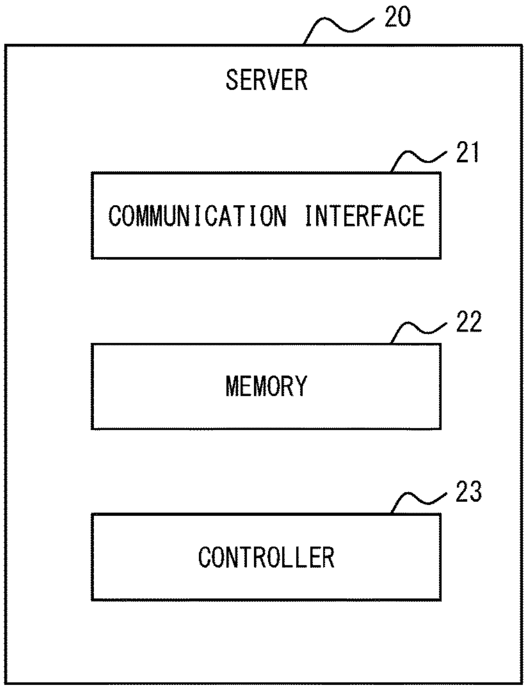
FIG. 5 is a block diagram illustrating a schematic configuration of a server.

As illustrated in FIG. 5, the server 20 includes a communication interface 21, a memory 22, and a controller 23.

The communication interface 21 includes at least one communication interface for connecting to the network 30. The communication interface may be compliant with, for example, mobile communication standards, wired local area network (LAN) standards, or wireless LAN standards, but these examples are not limiting. The communication interface may be compliant with any appropriate communication standards. In the present embodiment, the server 20 communicates with the vehicle 10 via the communication interface 21.

The memory 22 includes one or more memories. The memories included in the memory 22 may each function as, for example, a main memory, an auxiliary memory, or a cache memory. The memory 22 stores any information used for operations of the server 20. For example, the memory 22 may store a system program, an application program, a database, map information, the operation schedule of the plurality of vehicles 10, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire server 20. Details of the operations of the server 20 controlled by the controller 23 will be described later.

(Server Operation Flow)

Figure 6:
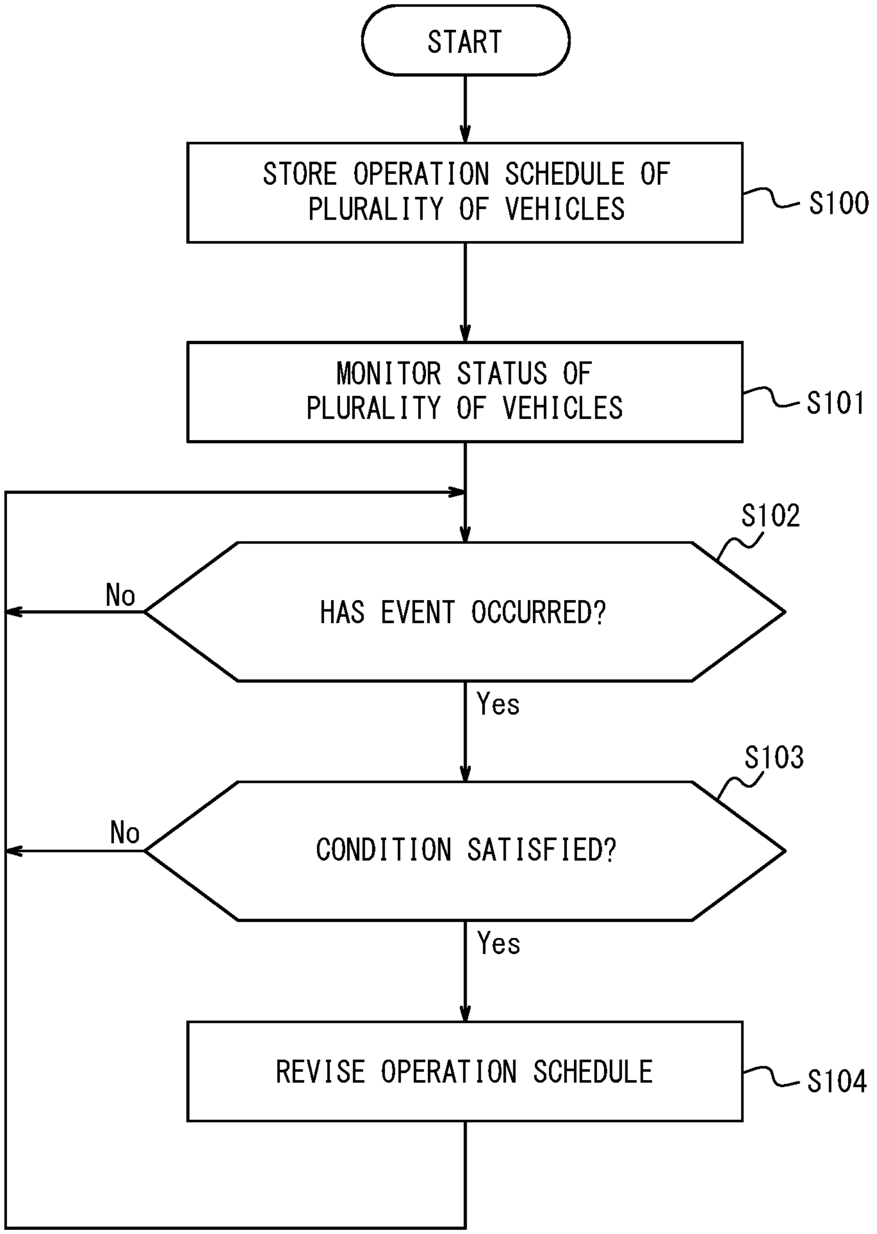
FIG. 6 is a flowchart illustrating operations of the server.

With reference to FIG. 6, operations of the server 20 according to the present embodiment will be described.

Step S100: The controller 23 of the server 20 stores the operation schedule of the plurality of vehicles 10 in the memory 22. The operation schedule may, for example, be generated automatically by the controller 23, inputted by an operator, or acquired from an external apparatus via the communication interface 21 and the network 30.

Details are now provided in accordance with the example illustrated in FIG. 3. As described above, the operation schedule stored in step S100 is determined so that the number of vehicles 10 traveling on the circulation route is maintained at a specified number of vehicles a (here, a=3), except for a certain time period (here, the period from time=0 to time=2t) from the operation start time of the transportation service that uses the plurality of vehicles 10. The operation schedule is determined so that "a" vehicles 10 traveling on the circulation route are arranged at substantially equal intervals on the circulation route, except for a certain time period (in this case, the period from time=0 to time=2t) from the operation start time. The operation schedule is also determined so that a plurality of vehicles 10 are not on the same lap simultaneously, except for a certain time period (in this case, the period from time=0 to time=8t) from the operation start time. Furthermore, the operation schedule is determined so that the switching between a vehicle that has completed the specified number of laps n (here, n=4 laps) and another vehicle 10 occurs once in a specified period P (here, P=4t).

Step S101: The controller 23 starts monitoring the status of the plurality of vehicles 10.

Specifically, the controller 23 is communicably connected to each vehicle 10 via the communication interface 21 and the network 30. The controller 23 notifies the plurality of vehicles 10 of the operation schedule of step S100. Each vehicle 10 operates in accordance with the operation schedule notified by the server 20. The controller 23 then monitors the status of each vehicle 10 by receiving vehicle information from each vehicle 10 periodically or at any appropriate timing, for example. The vehicle information includes positional information for the vehicle 10, but this example is not limiting. The vehicle information may include any appropriate information about the vehicle 10, such as the speed of the vehicle 10, information indicating deviation from the operation schedule (such as delay time), information indicating that failure has occurred in the vehicle 10, and information indicating the number of passengers in the vehicle. The controller 23 then stores the vehicle information received from each vehicle 10 in the memory 22 as operation history.

Step S102: The controller 23 judges whether a predetermined event that is not planned in the operation schedule has occurred. When it is judged that a predetermined event has occurred (step S102: Yes), the process advances to step S103. Conversely, when it is judged that a predetermined event has not occurred (step S102: No), the process repeats step S102.

In the present embodiment, the predetermined event may, as described above, include a first event in which a vehicle 10 traveling on the circulation route experiences failure, a second event in which the delay time of the vehicle 10 traveling on the circulation route relative to the operation schedule becomes equal to or greater than a threshold, or a third event in which the number of passengers using the transportation service (for example, the total of the number of passengers waiting for the arrival of a vehicle 10 at a bus stop and the number of passengers on board the vehicles 10 traveling on the circulation route) becomes equal to or greater than a threshold.

Any appropriate method can be used to judge whether a predetermined event has occurred. For example, the controller 23 may judge that the aforementioned first event has occurred when the controller 23 detects that a vehicle 10 traveling on the circulation route has experienced failure based on the vehicle information acquired from the plurality of vehicles 10 during the monitoring.

The controller 23 may acquire the delay time of the vehicle 10 traveling on the circulation route based on the vehicle information acquired from the plurality of vehicles 10 during the monitoring. The controller 23 may then judge that the aforementioned second event has occurred when the acquired delay time is equal to or greater than a threshold.

The controller 23 may acquire the number of passengers inside each vehicle 10 traveling on the circulation route based on the vehicle information acquired from the plurality of vehicles 10 during the monitoring. The controller 23 may, for example, acquire the number of passengers waiting for the arrival of a vehicle 10 at each bus stop based on information acquired via the communication interface 21 from a terminal apparatus provided at each bus stop. Specifically, the controller 23 may receive a captured image of the waiting space of the bus stop from the terminal apparatus and acquire the number of passengers from the image by image recognition, or the controller 23 may receive information indicating the number of passengers from the terminal apparatus. The controller 23 may then judge that the aforementioned third event has occurred when the total number of passengers is equal to or greater than a threshold.

Step S103: when it is judged in step S102 that an event has occurred (step S102: Yes), the controller 23 judges whether a predetermined condition is satisfied. When it is judged that a predetermined condition is satisfied (S103: Yes), the process advances to step S104. Conversely, when it is judged that a predetermined condition is not satisfied (S103: No), the process returns to step S102.

Here, the aforementioned predetermined condition and the method for judging whether the predetermined condition is satisfied will be described with specific examples. In the first example, the predetermined condition includes a first condition that the number of vehicles 10 on standby at the base is n or more. Although n=2 in the present embodiment, n may be any natural number equal to or greater than 2. A "vehicle 10 on standby" is a vehicle 10 for which refueling or maintenance is scheduled to be completed by the timing at which the next normal switching (i.e., switching of a vehicle 10 with another vehicle 10) occurs in the operation schedule. The controller 23 acquires the number of vehicles 10 on standby at the base from the operation schedule. The controller 23 then judges whether the aforementioned first condition is satisfied based on the number of vehicles 10 on standby at the base. In greater detail, the controller 23 judges that the first condition is not satisfied when the number of vehicles 10 on standby at the base is less than n.

In the second example, the predetermined condition includes a second condition that the number of additional vehicles 10 introduced into the circulation route from the base during a judgement period from a predetermined time before the time of the occurrence of the aforementioned predetermined event to the time of the occurrence is less than an upper limit. The "predetermined time" is, for example, the time required for the vehicle 10 to travel one lap of the circulation route (3t in the example illustrated in FIG. 3) but may be freely defined. The "upper limit" is, for example, two vehicles but may be freely defined. By referring to the operation schedule, the controller 23 acquires the number of additional vehicles 10 that were introduced into the circulation route from the base during the aforementioned judgement period. The controller 23 judges that the second condition is not satisfied when the acquired number of vehicles is equal to the upper limit (or when the number of vehicles is greater than the upper limit).

In the third example, the predetermined condition includes a third condition that a revision proposal for the operation schedule generated by the controller 23 satisfies a predetermined requirement, as described below. The controller 23 judges whether the third condition is satisfied based on the operation history of the plurality of vehicles 10. Specifically, the controller 23 generates, based on the operation history stored in the memory 22, a revision proposal that revises the operation schedule to introduce an additional vehicle into the circulation route from the base. Any method, such as an optimization algorithm, simulation, or artificial intelligence (AI), can be used to generate the revision proposal for the operation schedule. The controller 23 then judges whether the generated revision proposal satisfies a predetermined requirement. The "predetermined requirement" includes, for example, a requirement that at any given time in the operation schedule according to the revision proposal, the time between the completion of operations such as refueling or maintenance on a vehicle 10 and the next time the vehicle 10 is introduced into the circulation route from the base is equal to or greater than a threshold. When the revision proposal does not satisfy the predetermined requirement, the controller 23 judges that the third condition is not satisfied. According to this requirement, a time margin can be provided for the performance of operations such as refueling or maintenance on the vehicle 10. However, the "predetermined requirement" is not limited to this example and may be freely defined.

The predetermined condition may include two or more of the aforementioned first, second, and third conditions. For example, when the predetermined condition includes the first condition and the second condition, the controller 23 judges that the predetermined condition is satisfied when both the first condition and the second condition are satisfied and judges that the predetermined condition is not satisfied when the first condition and/or the second condition is not satisfied.

Step S104: When it is judged that the predetermined condition is satisfied in step S103 (step S103: Yes), the controller 23 revises the operation schedule to introduce an additional vehicle 10 into the circulation route from the base and notifies the plurality of vehicles 10 of the revised operation schedule. When the third condition is included in the above-described predetermined condition, the controller 23 revises the operation schedule according to the revision proposal generated in step S103. The plurality of vehicles 10 operate in accordance with the revised operation schedule of which notification was provided.

As described above, the server 20 according to the present embodiment stores the operation schedule of a plurality of vehicles 10. When a predetermined event that is not planned in the operation schedule occurs, the server 20 judges whether a predetermined condition is satisfied. When the server 20 judges that the predetermined condition is satisfied, the server 20 revises the operation schedule to introduce an additional vehicle 10 into the circulation route from the base.

According to this configuration, when a predetermined event that is not planned in the operation schedule occurs, it is judged whether the additional introduction should be performed. Accordingly, the technology for managing the operation of the plurality of vehicles 10 is improved by a reduction in the possibility of an adverse effect on the operation schedule as compared to a configuration in which the additional introduction is performed each time a predetermined event occurs, for example.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the server 20 in the above embodiment are distributed to a plurality of information processing apparatuses capable of communicating with each other can also be implemented. For example, an embodiment in which some or all of the components of the server 20 are provided in the vehicle 10 can also be implemented.

For example, an embodiment in which a general purpose computer functions as the server 20 according to the above embodiment can also be implemented. Specifically, a program in which processes for realizing the functions of the server 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An operation management method for managing a plurality of circulating buses, each circulating bus being introduced into a circulation route from a base and returning to the base to be switched with another circulating bus after traveling a specified number of laps, the operation management method comprising:

storing, by a server, an operation schedule of the plurality of circulating buses; and revising, by the server, the operation schedule to introduce an additional circulating bus into the circulation route from the base when a predetermined event not planned in the operation schedule occurs.

2. The operation management method of claim 1, wherein the predetermined event includes a first event in which a circulating bus traveling on the circulation route experiences failure, a second event in which a delay time of a circulating bus traveling on the circulation route relative to the operation schedule becomes equal to or greater than a threshold, or a third event in which the number of passengers using a transportation service that uses the plurality of circulating buses becomes equal to or greater than a threshold.

3. The operation management method of claim 1, wherein the server revised the operation schedule based on the number of circulating buses on standby at the base.

4. The operation management method of claim 3, wherein each circulating bus on standby at the base is a circulating bus for which refueling or maintenance is scheduled to be completed by a timing at which switching between the circulating bus and another circulating bus next occurs in the operation schedule before revision, and the server revises the operation schedule when the number of circulating buses on standby at the base is two or more.

5. The operation management method of claim 1, wherein the server revises the operation schedule when the number of additional circulating buses introduced into the circulation route during a period from a predetermined time before a time of occurrence of the predetermined event to the time of occurrence is less than an upper limit.

6. The operation management method of claim 1, further comprising:

storing, by the server, an operation history of the plurality of circulating buses, wherein the server revises the operation schedule based on the operation history.

7. The operation management method of claim 6, wherein the server generates, based on the operation history, a revision proposal that revises the operation schedule to introduce an additional circulating bus into the circulation route from the base, and revises the operation schedule according to the revision proposal when the generated revision proposal satisfies a predetermined requirement.

8. A server comprising a communication interface configured to communicate with a plurality of circulating buses, each circulating bus being introduced into a circulation route from a base and returning to the base to be switched with another circulating bus after traveling a specified number of laps, and a controller configured to:

store an operation schedule of the plurality of circulating buses; and revise the operation schedule to introduce an additional circulating bus into the circulation route from the base when a predetermined event not planned in the operation schedule occurs.

9. The server of claim 8, wherein the predetermined event includes a first event in which a circulating bus traveling on the circulation route experiences failure, a second event in which a delay time of a circulating bus traveling on the circulation route relative to the operation schedule becomes equal to or greater than a threshold, or a third event in which the number of passengers using a transportation service that uses the plurality of circulating buses becomes equal to or greater than a threshold.

10. The server of claim 8, wherein the controller is configured to revise the operation schedule based on the number of circulating buses on standby at the base.

11. The server of claim 10, wherein each circulating bus on standby at the base is a circulating bus for which refueling or maintenance is scheduled to be completed by a timing at which switching between the circulating bus and another circulating bus next occurs in the operation schedule before revision, and the controller is configured to revise the operation schedule when the number of circulating buses on standby at the base is two or more.

12. The server of claim 8, wherein the controller is configured to revise the operation schedule when the number of additional circulating buses introduced into the circulation route during a period from a predetermined time before a time of occurrence of the predetermined event to the time of occurrence is less than an upper limit.

13. The server of claim 8, wherein the controller is configured to store an operation history of the plurality of circulating buses, and revise the operation schedule based on the operation history.

14. The server of claim 13, wherein the controller is configured to generate, based on the operation history, a revision proposal that revises the operation schedule to introduce an additional circulating bus into the circulation route from the base, and revise the operation schedule according to the revision proposal when the generated revision proposal satisfies a predetermined requirement.

15. A system comprising a plurality of circulating buses, each circulating bus being introduced into a circulation route from a base and returning to the base to be switched with another circulating bus after traveling a specified number of laps, and a server configured to communicate with the plurality of circulating buses, wherein the server is configured to store an operation schedule of the plurality of circulating buses;

the plurality of circulating buses operates in accordance with the operation schedule;

the server is configured to revise the operation schedule to introduce an additional circulating bus into the circulation route from the base when a predetermined event not planned in the operation schedule occurs; and the plurality of circulating buses operates in accordance with the revised operation schedule.

16. The system of claim 15, wherein the predetermined event includes a first event in which a circulating bus traveling on the circulation route experiences failure, a second event in which a delay time of a circulating bus traveling on the circulation route relative to the operation schedule becomes equal to or greater than a threshold, or a third event in which the number of passengers using a transportation service that uses the plurality of circulating buses becomes equal to or greater than a threshold.

17. The system of claim 15, wherein the server is configured to revise the operation schedule based on the number of circulating buses on standby at the base.

18. The system of claim 17, wherein each circulating bus on standby at the base is a circulating bus for which refueling or maintenance is scheduled to be completed by a timing at which switching between the circulating bus and another circulating bus next occurs in the operation schedule before revision, and the server is configured to revise the operation schedule when the number of circulating buses on standby at the base is two or more.

19. The system of claim 15, wherein the server is configured to revise the operation schedule when the number of additional circulating buses introduced into the circulation route during a period from a predetermined time before a time of occurrence of the predetermined event to the time of occurrence is less than an upper limit.

20. The system of claim 15, wherein the server is configured to generate, based on an operation history of the plurality of circulating buses, a revision proposal that revises the operation schedule to introduce an additional circulating bus into the circulation route from the base, and revise the operation schedule according to the revision proposal when the generated revision proposal satisfies a predetermined requirement.

* * * * *